United States Patent
Kato et al.

(10) Patent No.: US 11,067,137 B2
(45) Date of Patent: Jul. 20, 2021

(54) SELECTABLE ONE-WAY CLUTCH

(71) Applicants: TOYOTA JIDOSHA KABUSHIKI KAISHA, Toyota (JP); Means Industries, Inc., Saginaw, MI (US)

(72) Inventors: Shotaro Kato, Shizuoka-ken (JP); Hiroyuki Shioiri, Yokohama (JP); Hiroyuki Ogawa, Susono (JP); Hiroyuki Shibata, Odawara (JP); Mitsuaki Tomita, Susono (JP); Yuki Kurosaki, Yamato (JP); Joshua D. Hand, Midland, MI (US)

(73) Assignees: TOYOTA JIDOSHA KABUSHIKI KAISHA, Toyota (JP); Means Industries, Inc., Saginaw, MI (US)

( * ) Notice: Subject to any disclaimer, the term of this patent is extended or adjusted under 35 U.S.C. 154(b) by 266 days.

(21) Appl. No.: 15/878,003

(22) Filed: Jan. 23, 2018

(65) Prior Publication Data

US 2019/0101171 A1  Apr. 4, 2019

Related U.S. Application Data

(60) Provisional application No. 62/568,022, filed on Oct. 4, 2017.

(51) Int. Cl.
| | | |
|---|---|---|
| *F16D 41/06* | (2006.01) | |
| *F16D 41/08* | (2006.01) | |
| *F16D 41/069* | (2006.01) | |

(52) U.S. Cl.
CPC ......... *F16D 41/084* (2013.01); *F16D 41/069* (2013.01); *F16D 2041/0603* (2013.01)

(58) Field of Classification Search
CPC .......... F16D 41/069; F16D 2041/0603; F16D 41/06; F16D 41/084; F16D 41/12–16; F16D 41/30; F16D 41/125
See application file for complete search history.

(56) References Cited

U.S. PATENT DOCUMENTS

| | | | |
|---|---|---|---|
| 5,855,263 A | * | 1/1999 | Fergle ..................... F16D 41/12 192/108 |
| 6,571,926 B2 | | 6/2003 | Pawley |
| 7,258,214 B2 | * | 8/2007 | Pawley ................... F16D 41/16 192/43.1 |

(Continued)

*Primary Examiner* — Ernesto A Suarez
*Assistant Examiner* — Lillian T Nguyen
(74) *Attorney, Agent, or Firm* — Hunton Andrews Kurth LLP

(57) ABSTRACT

A selectable one-way clutch includes: a pocket plate including pockets provided along a circumferential direction on one surface; a notch plate that is rotatable with respect to the pocket plate, the notch plate including notches provided along a circumferential direction on a surface facing the one surface; struts that are plate-shaped and housed in the respective pockets; and a selector plate disposed between the pocket plate and the notch plate, and configured to switch, by rotating coaxially with the pocket plate, between: a state in which the struts have risen toward the notch plate; and a state in which the struts are housed in the respective pockets. The notch plate includes flat portions between the notches that are adjacent in the circumferential direction, and each flat portion includes a first recess at a position where the corresponding strut having risen toward the notch plate is brought into contact.

20 Claims, 7 Drawing Sheets

(56) References Cited

U.S. PATENT DOCUMENTS

| | | | | |
|---|---|---|---|---|
| 8,267,231 | B2* | 9/2012 | Holmes | B60K 6/50 |
| | | | | 192/43.1 |
| 8,844,693 | B2 | 9/2014 | Pawley | |
| 9,188,174 | B2 | 11/2015 | Beiser et al. | |
| 10,677,297 | B2* | 6/2020 | Shioiri | F16D 41/14 |
| 2004/0216975 | A1* | 11/2004 | Ruth | F16D 41/125 |
| | | | | 192/46 |
| 2005/0183918 | A1* | 8/2005 | Hou | F16D 41/12 |
| | | | | 192/46 |
| 2008/0000747 | A1* | 1/2008 | Saka | F16D 41/125 |
| | | | | 192/43.2 |
| 2011/0297500 | A1* | 12/2011 | Shaw | F16D 41/12 |
| | | | | 192/46 |
| 2012/0103746 | A1* | 5/2012 | Bird | F16D 41/14 |
| | | | | 192/46 |
| 2012/0145506 | A1* | 6/2012 | Sarnie | F16D 41/084 |
| | | | | 192/46 |
| 2013/0319810 | A1* | 12/2013 | Bird | F16D 41/14 |
| | | | | 192/45.1 |
| 2014/0146077 | A1* | 5/2014 | Labbi | G06F 16/288 |
| | | | | 345/619 |
| 2015/0053523 | A1* | 2/2015 | Lim | F16D 41/064 |
| | | | | 192/45.001 |
| 2016/0341263 | A1* | 11/2016 | Shioiri | F16D 41/125 |
| 2017/0067517 | A1* | 3/2017 | Miyake | F16D 41/125 |
| 2017/0227072 | A1* | 8/2017 | Pawley | F16D 41/12 |
| 2018/0266502 | A1* | 9/2018 | Shioiri | F16D 41/12 |

* cited by examiner

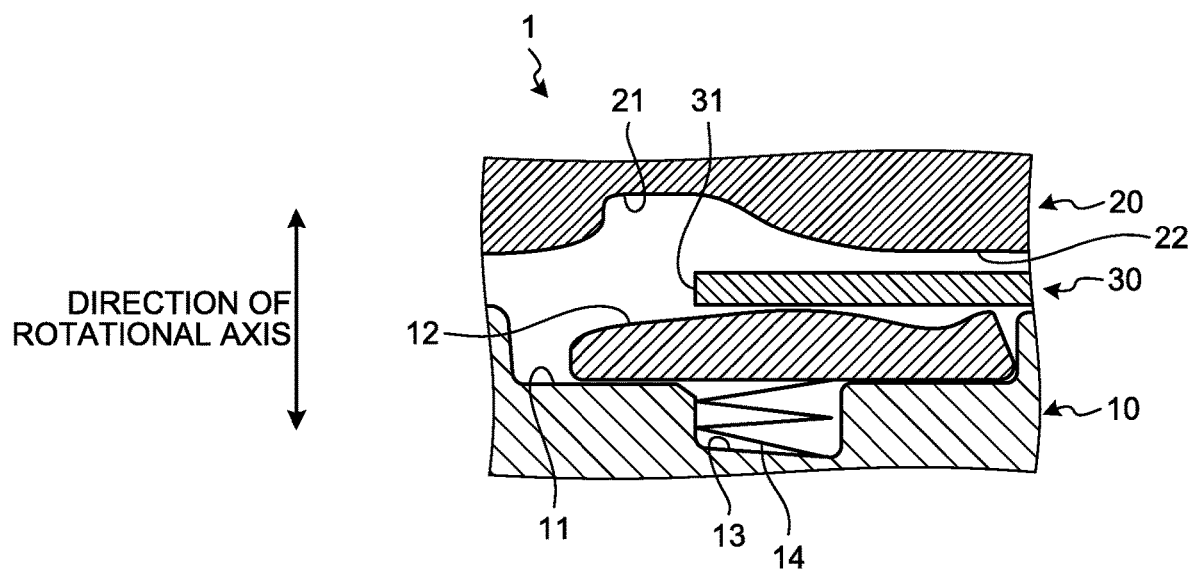
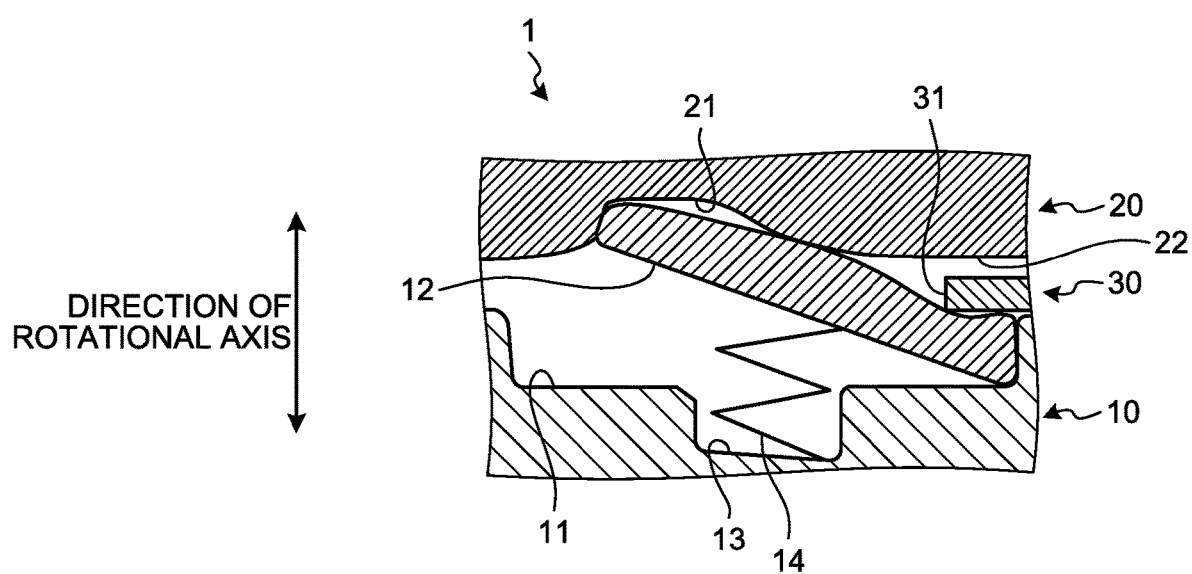

SELECTABLE ONE-WAY CLUTCH

CROSS REFERENCE TO RELATED APPLICATIONS

The present application claims priority to and incorporates by reference the entire contents of U.S. provisional patent application 62/568,022, filed on Oct. 4, 2017.

BACKGROUND

The present disclosure relates to a selectable one-way clutch.

As an example of a one-way clutch, U.S. Pat. No. 8,844,693 discloses a selectable one-way clutch including a pocket plate that has a plurality of pockets each housing a strut, a notch plate that has a plurality of notches with which the respective struts are engaged, and a selector plate that is interposed between the pocket plate and the notch plate, and switches between an engaged configuration and a disengaged configuration.

SUMMARY

In the selectable one-way clutch described above, there are sometimes cases in which, while the notch plate is being rotated at a high speed in an engaging direction (forward direction) with respect to the pocket plate, the selector plate becomes erroneously rotated, and the strut becomes erroneously engaged with the notch on the notch plate that is rotating at a high speed.

To protect parts against damages resultant of such an erroneous engagement, a conventional selectable one-way clutch is provided with a function for suppressing such an erroneous engagement by enabling parts other than the notches on the notch plate to flick the struts away (hereinafter, referred to as a "ratchet function") while the notch plate is being rotated in the engaging direction at a predetermined revolving speed or higher.

However, as illustrated in the part A in FIG. 13, in a conventional selectable one-way clutch 101, when a strut 112 comes into contact with a notch plate 130 (hereinafter, referred to as a "ratcheting operation"), a top surface 112a of the strut 112 may become bonded to a flat portion 132 extending between the notches 131 that are adjacent in the circumferential direction, due to the surface tension of oil (not illustrated) lying between the notch plate 130 and the strut 112.

As a result, as the notch plate 130 is rotated, the strut 112 may be pulled into the notch 131, as indicated by the arrow B in FIG. 13, and the strut 112 may become erroneously engaged with the notch 131. In FIG. 13, to illustrate the change in the orientation of the strut 112 during the ratcheting operation in the temporal order, the contours of the strut 112 at different time are illustrated in plurality in an overlapping manner.

There is a need for a selectable one-way clutch capable of suppressing an erroneous engagement resultant of the strut being pulled into the notch during the ratcheting operation.

According to one aspect of the present disclosure, there is provided a selectable one-way clutch including: a pocket plate including a plurality of pockets provided along a circumferential direction on one surface of the pocket plate; a notch plate that is rotatable with respect to the pocket plate, the notch plate including a plurality of notches provided along a circumferential direction on a surface of the notch plate facing the one surface; struts that are plate-shaped and housed in the respective pockets; and a selector plate disposed between the pocket plate and the notch plate, and configured to switch, by rotating coaxially with the pocket plate, between: a state in which the struts have risen toward the notch plate; and a state in which the struts are housed in the respective pockets, wherein the notch plate includes flat portions between the notches that are adjacent in the circumferential direction, and each of the flat portions includes a first recess at a position where the corresponding strut having risen toward the notch plate is brought into contact.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 1 is a cross-sectional view illustrating a structure of a relevant portion of a selectable one-way clutch according to a first embodiment;

FIG. 2 is a cross-sectional view illustrating a structure of the relevant portion of the selectable one-way clutch according to the first embodiment;

DETAILED DESCRIPTION

Figure 3:
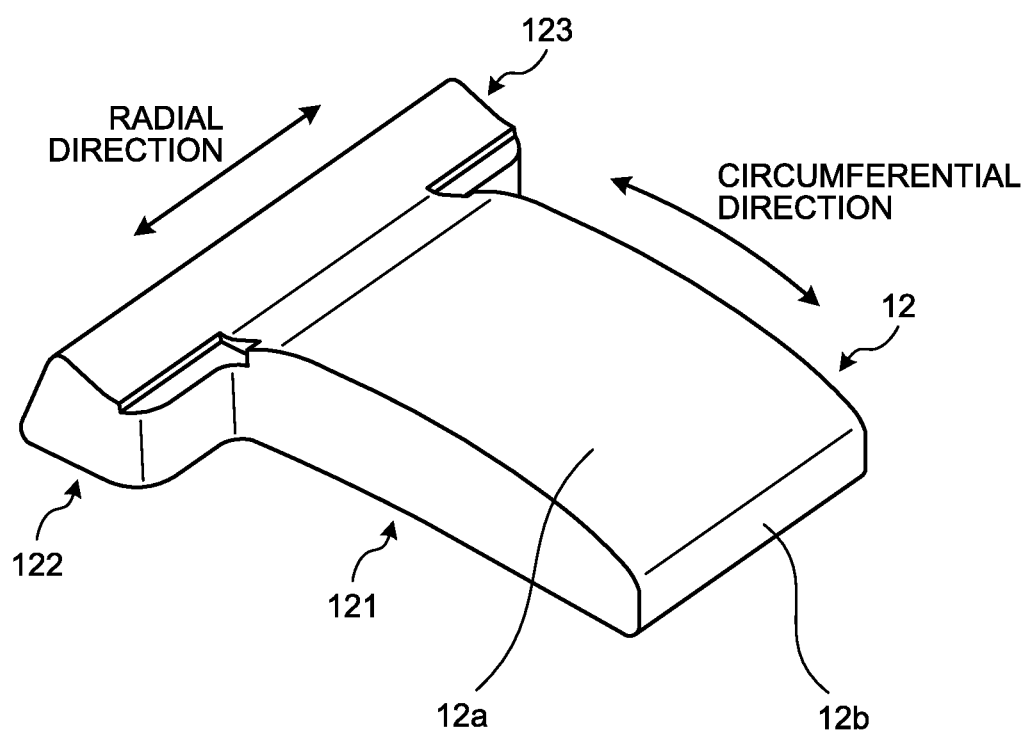
FIG. 3 is a perspective view illustrating a structure of a strut in the selectable one-way clutch according to the first embodiment.

A selectable one-way clutch (hereinafter, referred to as an "SOWC") according to some embodiments will now be explained with reference to the drawings. The present disclosure is, however, not limited to these embodiments described below. The elements disclosed in the embodiments include those that are replaceable and easily replaceable by those skilled in the art, and those substantially the same.

First Embodiment

An SOWC 1 is configured to be mounted on a power transmission device provided to a hybrid vehicle, for example, and includes a pocket plate 10, a notch plate 20, and a selector plate 30, as illustrated in FIGS. 1 and 2. Lubrication oil (not illustrated) is applied to the internal of the SOWC 1, that is, between the pocket plate 10 and the selector plate 30 and between the selector plate 30 and the notch plate 20. FIGS. 1 and 2 provide enlarged cross-sectional views of a relevant portion of the SOWC 1, but the overall structure of the SOWC 1 is not illustrated.

The pocket plate 10 has a cylindrical shape. A plurality of pockets (recessed housing) 11 that are concave in the thickness direction are provided to one surface of the pocket plate 10, that is, the surface on the side facing the notch plate 20. A plate-shaped strut (engaging piece) 12 is then housed in the pocket 11. The "thickness direction" is a direction matching the direction of the rotational axis of the notch plate 20.

The pockets 11 are provided at positions facing respective notches 21 on the notch plate 20. An elastic member 14 biasing the strut 12 toward the notch plate 20 is positioned between the strut 12 and a recess 13 provided to the pocket 11.

The strut 12 is arranged in each of the pockets 11. The struts 12 are configured to have its orientation switched, as the selector plate 30 is rotated coaxially with the pocket plate 10, between a configuration in which all of the struts 12 are housed in the respective pocket 11, as illustrated in FIG. 1, and a configuration in which one ends of the struts 12 have risen toward the notch 21, as illustrated in FIG. 2.

Specifically, the strut 12 has a body portion 121 that extends along the circumferential direction of the notch plate 20, and an inner protrusion 122 and an outer protrusion 123 that extend from an end of the body portion 121 in the circumferential direction, toward the opposite directions with respect to each other along the radial direction of the notch plate 20, as illustrated in FIG. 3. The inner protrusion 122 and the outer protrusion 123 serve as a rotational axis when the strut 12 rises. A top surface 12a of the body portion 121 (strut 12) delineates a gentle curve.

The notch plate 20 has an annular shape. The notch plate 20 is positioned facing the surface of the pocket plate 10 having the pockets 11, and is configured to be rotatable relatively to the pocket plate 10.

Among the surfaces of the notch plate 20, the surface facing the pocket plate 10 (pockets 11) is provided with a plurality of notches (engaging recesses) 21 that are concave in the thickness direction. The notch 21 is a recess where the one end of the strut 12 having risen toward the notch 21 enters, through a window hole 31 provided to the selector plate 30.

The selector plate 30 has an annular shape. The selector plate 30 is interposed between the pocket plate 10 and the notch plate 20. The selector plate 30 has window holes 31 penetrating in the thickness direction, at the positions facing the respective pockets 11 and struts 12 provided to the pocket plate 10.

By rotating coaxially with the pocket plate 10 by a predetermined angle, the selector plate 30 switches between a configuration in which the struts 12 have risen toward the notch plate 20, and engaged with the respective notches (engaged configuration), and a configuration in which the struts 12 are housed in the respective pockets 11 (disengaged configuration).

For example, when the positions of the window holes 31 are not matched with those of the respective pockets 11 in the circumferential direction of the SOWC 1, as illustrated in FIG. 1, the pockets 11 are closed by the part of the selector plate 30 without the window holes 31, and the struts 12 are pushed into the respective pockets 11 by the part without the window holes 31 so that all of the struts 12 are housed in the respective pockets 11. In this manner, the SOWC 1 is switched to the disengaged configuration (released configuration). In this disengaged configuration, because the struts 12 are not in engagement with the respective notches 21 (with the engagements between the struts 12 and the respective notch 21 released), no torque is communicated between the pocket plate 10 and the notch plate 20.

By contrast, when the positions of the window holes 31 are substantially matched with those of the respective pockets 11 in the circumferential direction of the SOWC 1, as illustrated in FIG. 2, the one ends of the struts 12 rise toward the notch plate 20 through the respective window holes 31, by being pressed by the elastic member 14. As the notch plate 20 is further rotated with respect to the pocket plate 10 in the engaging direction (forward direction), with the one ends of the respective struts 12 risen toward the notch plate 20, the struts 12 become engaged with the respective notches 21, and brings the SOWC 1 into the engaged configuration. In this engaged configuration, because the struts 12 are engaged with the respective notches 21, torque is transmitted between the pocket plate 10 and the notch plate 20.

In the conventional SOWC 101, the strut 112 sometimes becomes bonded to the flat portion 132 due to the surface tension of the oil lying between the notch plate 130 and the top surface 112a of the strut 112, that is, due to the surface tension of the oil nipped between the notch plate 130 and the top surface 112a of the strut 112 working in directions causing the notch plate 130 and the strut 112 to be bonded to each other, during the ratcheting operation, as described earlier. This bonding has led to the problem that the strut 112 is pulled into the notch 131, and becomes erroneously engaged with the notch 131 of the notch plate 130 that is rotating at a high speed (see FIG. 13). Such a problem occurs prominently when the oil temperature is low, and the oil is highly viscous. The SOWC 1 according to the embodiment is therefore designed to solve the problem by devising the shape of the notch plate 20. A specific structure of the notch plate 20 according to the embodiment will now be explained with reference to FIGS. 4 to 8.

Figure 4:
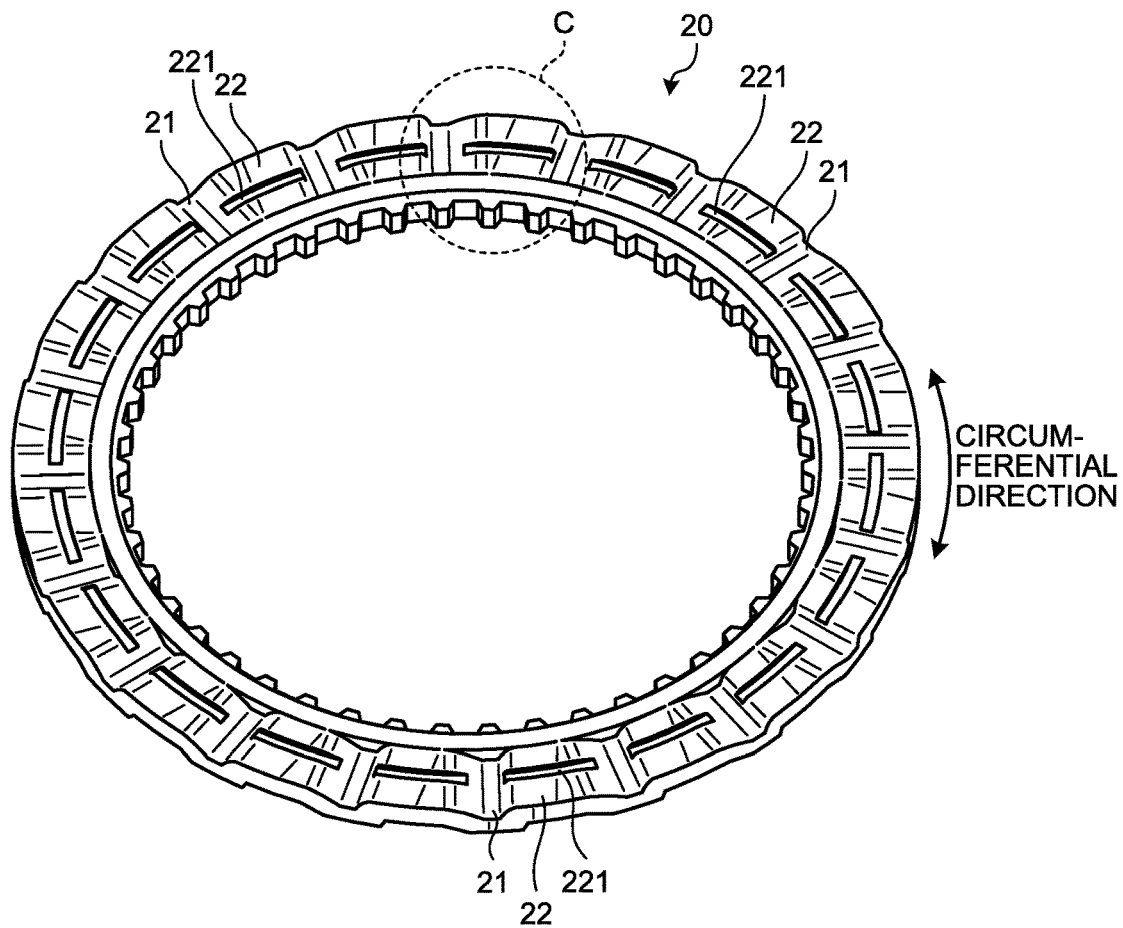
FIG. 4 is a perspective view illustrating a structure of a notch plate in the selectable one-way clutch according to the first embodiment.
Figure 5:
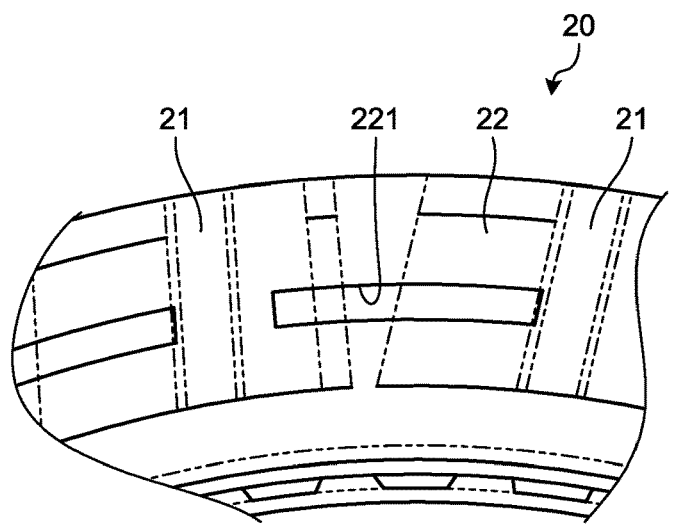
FIG. 5 is an enlarged view of the part C in FIG. 4.

The notch plate 20 has flat portions 22 extending between the notches 21 that are adjacent in the circumferential direction, as illustrated in FIGS. 4 and 5. These flat portions 22 face the surface of the pocket plate 10 having the pockets 11, as illustrated in FIG. 1, in the rotational axis direction.

Figure 6:
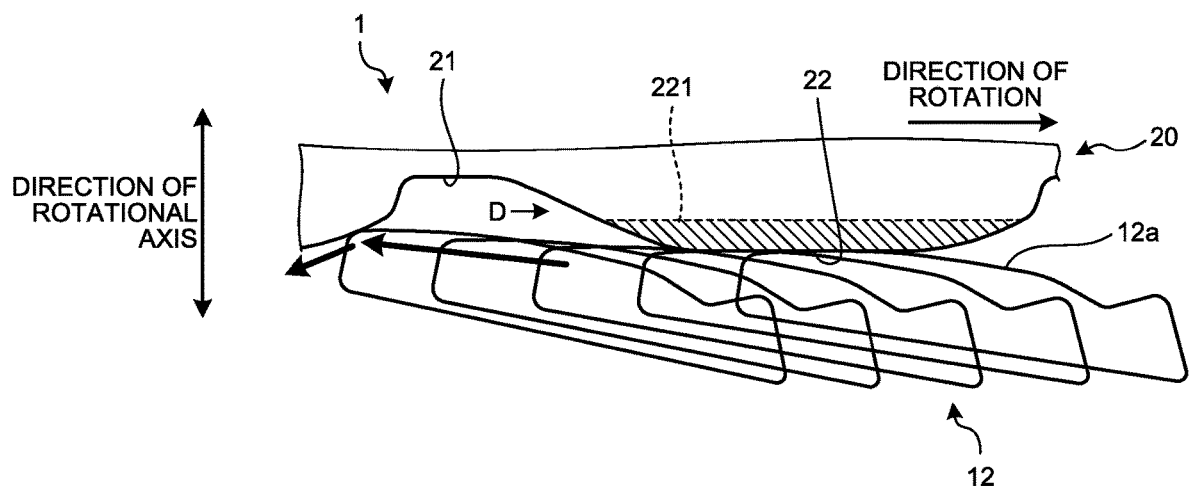
FIG. 6 is a side view illustrating a structure of the notch plate and the strut in the selectable one-way clutch according to the first embodiment.
Figure 13:
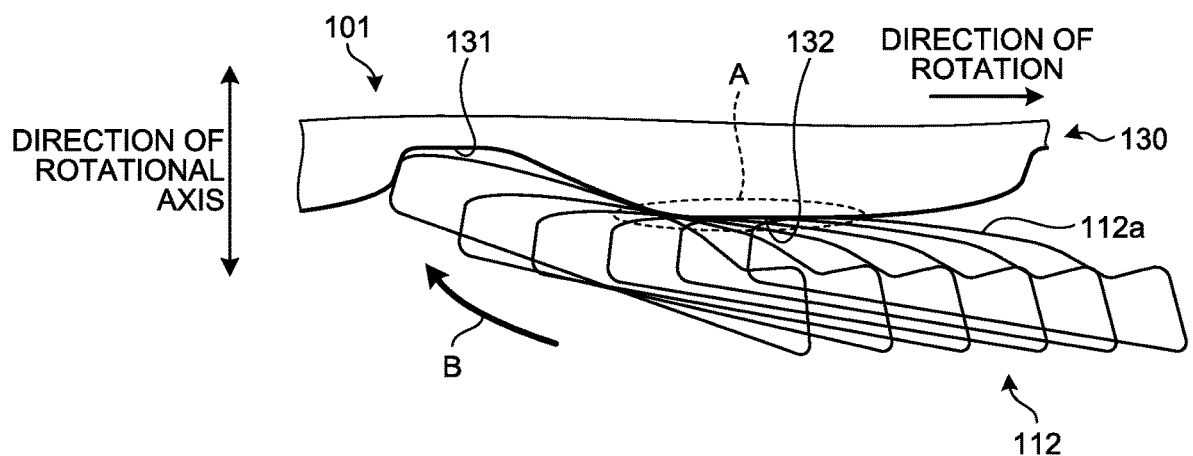
FIG. 13 is a side view illustrating a structure of a notch plate and a strut in a conventional selectable one-way clutch.

A part of the flat portion 22 is provided with a recess having a predetermined depth (first recess) 221, as illustrated in FIGS. 4 and 5, unlike the flat portion 132 that is provided to the conventional notch plate 130 and is entirely flat (see FIG. 13). This recess 221 is provided to the flat portion 22 at a position with which the strut 12 having risen toward the notch plate 20 is brought into contact, as illustrated in FIGS. 6 and 7.

The recess 221 is a groove extending in the circumferential direction of the notch plate 20, and is provided at the center in the width direction of the flat portion 22, as illustrated in FIGS. 4 and 5. This groove-shaped recess 221 is provided to each of the flat portions 22 on the notch plate 20, and is provided in plurality along the circumferential direction of the notch plate 20. By providing the recess 221 to the flat portion 22 of the notch plate 20, the area of the flat portion 22 with which the top surface 12a of the strut 12 is brought into contact is reduced.

Figure 7:
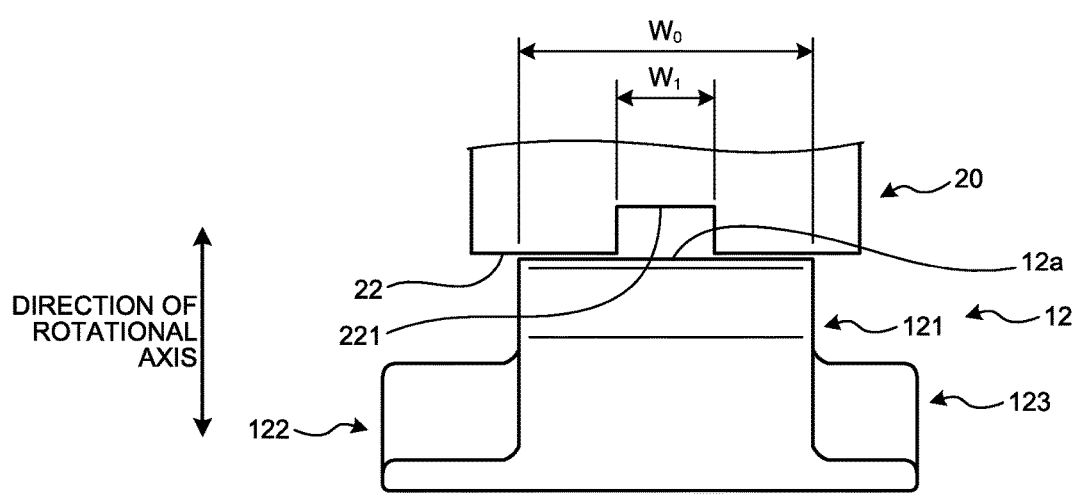
FIG. 7 is a schematic for explaining a relation between the notch plate and the strut in the selectable one-way clutch according to the first embodiment.

For example, as illustrated in FIG. 7, denoting the width of the body portion 121 of the strut 12 as $W_0$, and denoting the width of the recess 221 as $W_1$, the reduction ratio of the area of the flat portion 22 with which the top surface 12a of the strut 12 is brought into contact can be expressed as "$(W_0-W_1)/W_0$". FIG. 7 illustrates the notch plate 20 and the strut 12 viewed from the direction of the arrow D in FIG. 6.

Figure 8:
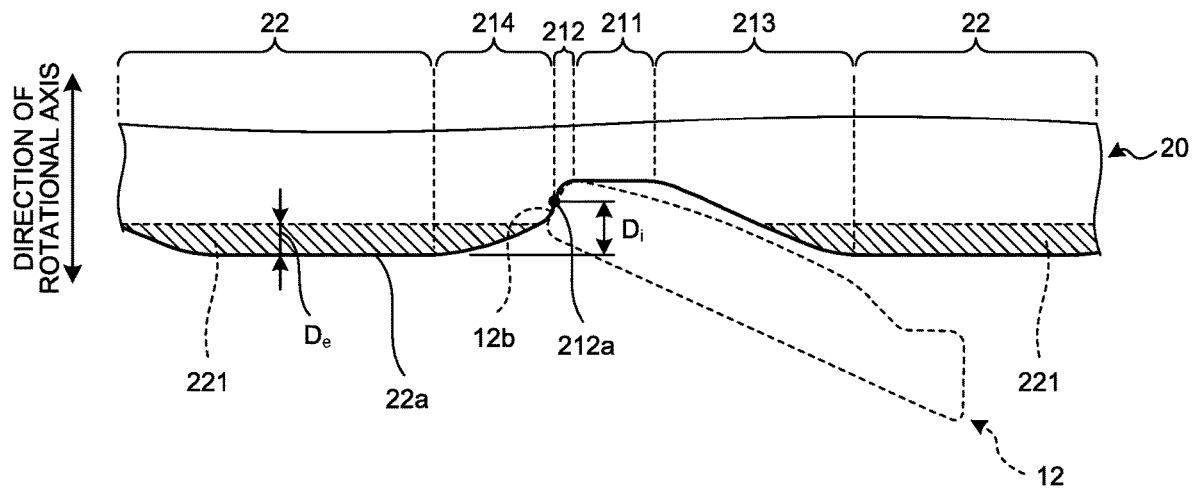
FIG. 8 is a schematic for explaining the depth of the recess provided to the notch plate in the selectable one-way clutch according to the first embodiment.

Specifically, the notch 21 of the notch plate 20 has a bottom surface 211, a catching surface 212, a slope surface (first slope surface) 213, and a slope surface (second slope surface) 214, as illustrated in FIG. 8. The catching surface 212 is inclined in a direction from the bottom surface 211 of the notch 21 toward the pocket plate 10. A tip 12b of the strut 12 that is engaged with the notch 21 is brought into contact with the catching surface 212.

The recess 221 has a substantially constant depth, except for a start end and a finish end of the groove, and the bottom surface is flat. The recess 221 is provided at a position not overlapping with the catching surface 212. In other words, the recess 221 is provided to a depth not overlapping with an end 212a of the catching surface 212. For example, as illustrated in FIG. 8, when the recess 221 is provided as a groove extending in parallel with a surface 22a of the flat portion 22, a depth $D_e$ of the recess 221 is set smaller than a distance $D_i$ from the surface 22a of the flat portion 22 to the end 212a of the catching surface 212 ($D_e<D_i$) in the rotational axis direction.

As the tip 12b of the strut 12 collides with the catching surface 212, a contact pressure is repeatedly applied to the catching surface 212. If the recess 221 is provided to the position overlapping with the catching surface 212, the area of the catching surface 212 with which the tip 12b of the strut 12 is brought into contact is reduced. Such a reduction in the area may reduce the durability of the notch plate 20, and the contact pressure may cause the catching surface 212 to crack, for example. By contrast, in the SOWC 1 according to the embodiment, because the recess 221 is provided at a position not overlapping with the catching surface 212, an area of a predetermined size or larger can be ensured as the area of the catching surface 212 with which the tip 12b of the strut 12 is brought into contact. Therefore, deterioration in the durability of the notch plate 20 can be suppressed.

In the SOWC 1 having such a structure, the recess 221 is provided to the flat portion 22 of the notch plate 20. Therefore, when the strut 12 rises and is brought into contact with the flat portion 22 during the ratcheting operation, the area of the notch plate 20 with which the strut 12 is brought into contact (more specifically, the width of the notch plate 20 with which the strut 12 is brought into contact in the radial direction of the notch plate 20) is reduced, compared with a structure without the recess 221. As the area of the notch plate 20 with which the strut 12 is brought into contact is reduced, the surface tension of the oil lying between the notch plate 20 and the strut 12 is reduced. Therefore, an erroneous engagement caused by the strut 12 being pulled into the notch 21 can be suppressed.

Second Embodiment

In the first embodiment described above, the notch plate 20 is provided with a recess 221 for reducing the area of the notch plate 20 with which the strut 12 is brought into contact (see FIG. 4). However, such a recess may be provided to the strut. An SOWC according to a second embodiment will now be explained with reference to FIGS. 9 to 11. In the SOWC according to the embodiment, the elements other than struts 12A and a notch plate 20A are the same as those in the SOWC 1 described above (see FIG. 1). Therefore, in the description below, the explanations thereof will be omitted.

Figure 9:
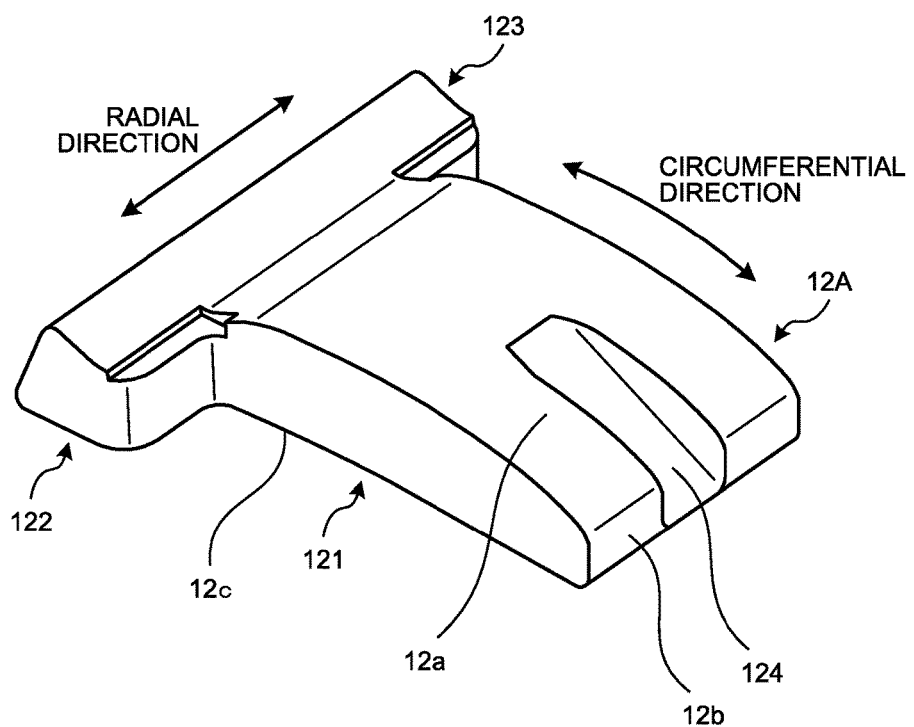
FIG. 9 is a perspective view illustrating a structure of a strut in a selectable one-way clutch according to a second embodiment.
Figure 11:
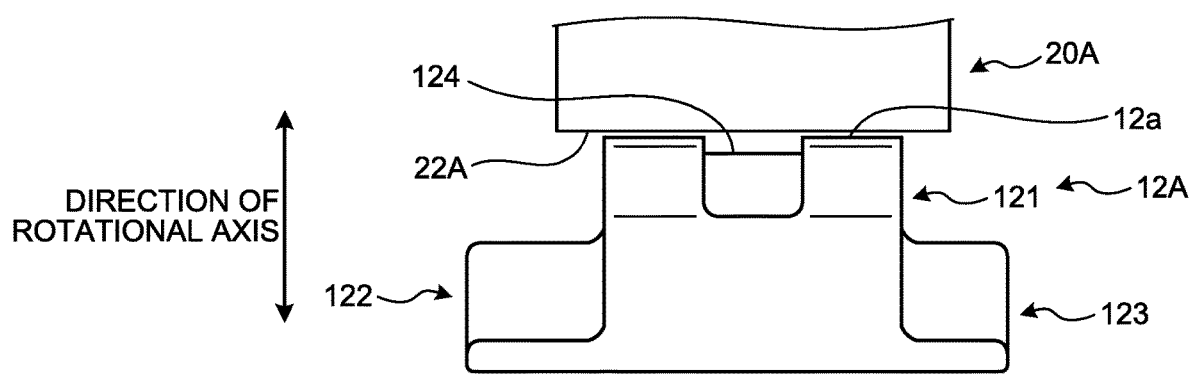
FIG. 11 is a schematic for explaining a relation between the notch plate and the strut in the selectable one-way clutch according to the second embodiment.

The strut 12A according to the embodiment has the body portion 121 extending in the circumferential direction of the notch plate 20, and the inner protrusion 122 and the outer protrusion 123 that extend from an end of the body portion 121 in the circumferential direction, toward the opposite directions with respect to each other along the radial direction of the notch plate 20, as illustrated in FIG. 9. A part of the top surface 12a of the body portion 121 (strut 12A) is provided with a recess (second recess) 124 having a predetermined depth. This recess 124 is provided to the top surface 12a of the body portion 121 at a position where the strut 12A is brought into contact with a flat portion 22A when the strut 12A rises toward the notch plate 20A, as illustrated in FIG. 11.

The recess 124 is a groove extending in the circumferential direction of the notch plate 20A, as illustrated in FIG. 9, and is provided at the center in the width direction of the body portion 121. This groove-shaped recess 124 is provided to each of the struts 12A provided to the pocket plate 10. The recess 124 is provided from a predetermined position on the top surface 12a of the body portion 121, e.g., from the center in the width direction and the length direction of the body portion 121, to the tip 12b of the body portion 121 (strut 12A). The recess 124 also has a slope surface inclined from the top surface 12a of the body portion 121 toward a bottom surface 12c of the body portion 121 (strut 12A).

Figure 10:
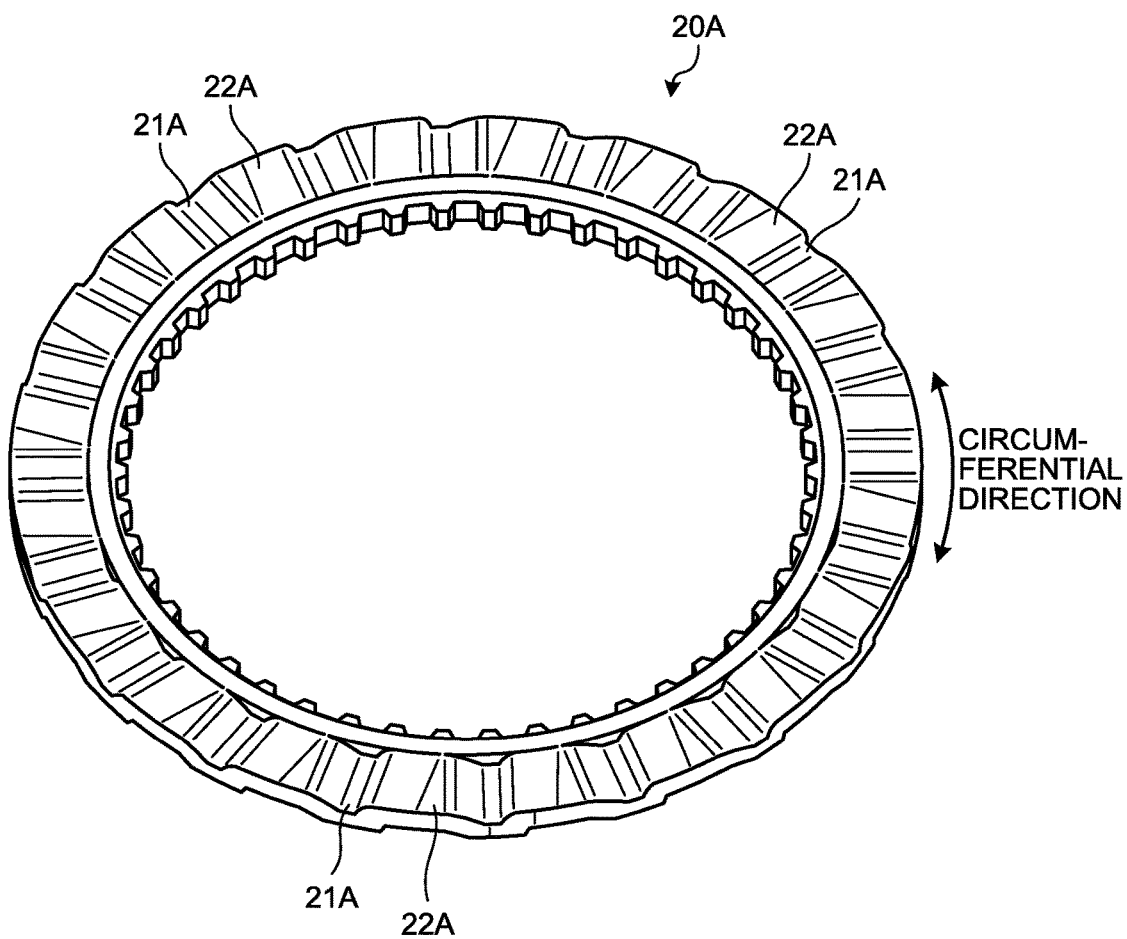
FIG. 10 is a perspective view illustrating a structure of a notch plate in the selectable one-way clutch according to the second embodiment.

The notch plate 20A according to the embodiment has flat portions 22A extending between notches 21A that are adjacent in the circumferential direction, as illustrated in FIG. 10. This flat portion 22A does not have the recess 221 (see FIG. 4) provided to the flat portion 22 in the notch plate 20 described above, and the flat portion 22A is entirely flat.

In the SOWC according to the second embodiment having such a structure, because the strut 12A is provided with the recess 124, the area of the notch plate 20A with which the strut 12A is brought into contact can be reduced, compared with the structure without the recess 124. Therefore, the surface tension of the oil lying between the notch plate 20A and the strut 12A can be reduced, so that an erroneous engagement resultant of the strut 12A being pulled into the notch 21A can be suppressed.

Third Embodiment

In the first embodiment and the second embodiment described above, the recess 221, 124 for reducing the area of the notch plate 20, 20A with which the strut 12, 12A is brought into contact is provided to one of the notch plate and the strut. However, both of the notch plate and the strut may be provided with the recess. An SOWC according to a third embodiment will now be explained with reference to FIG. 12. In the SOWC according to the embodiment, the elements other than the strut 12A and the notch plate 20 are the same as those in the SOWC 1 described above (see FIG. 1). Therefore, in the description below, the explanations thereof will be omitted.

The SOWC according to the embodiment includes the notch plate 20 in which the recess 221 is provided to the flat portions 22, and the strut 12A in which the recess 124 is provided to the top surface 12a.

Figure 12:
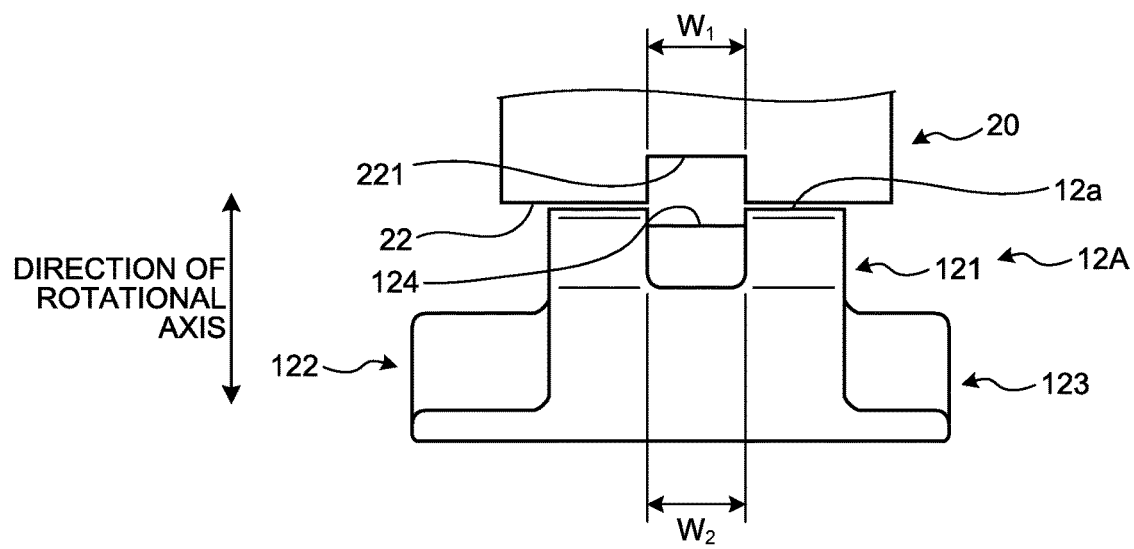
FIG. 12 is a schematic for explaining a relation between the notch plate and the strut in the selectable one-way clutch according to a third embodiment.

The recess 221 on the notch plate 20 and the recess 124 on the strut 12A are provided at overlapping positions in the rotational axis direction. In other words, the recess 221 and the recess 124 face each other in the rotational axis direction, as illustrated in FIG. 12, and are provided at such positions that a space is formed thereby when the top surface 12a of the strut 12A is brought into contact with the flat portion 22 of the notch plate 20. The configuration in which the recesses "overlap in the rotational axis direction" described above includes not only the configuration in which the recess 221 and the recess 124 completely overlap with each other, as illustrated in FIG. 12, but also a configuration in which the recess 221 and the recess 124 partly overlap with each other in the rotational axis direction. In other words, the recess 221 and the recess 124 overlap each other at least partly, when the top surface 12a of the strut 12A is brought into contact with the flat portion 22 of the notch plate 20.

The width $W_1$ of the recess 221 is set to be equal to the width $W_2$ of the recess 124 ($W_1=W_2$). In this manner, when the strut 12A rises during the ratcheting operation, the top surface 12a of the strut 12A can be fully brought into contact with the flat portion 22 of the notch plate 20, so that a contact area of a predetermined size or larger can be ensured. Therefore, deterioration in the durability of the notch plate 20 can be suppressed.

In the SOWC according to the third embodiment having such a structure, because the recess 221 is provided to the notch plate 20, and the recess 124 is provided to the strut 12A, the area of the notch plate 20 with which the strut 12A is brought into contact is reduced, compared with that without the recesses 221, 124. Therefore, the surface tension of the oil lying between of the notch plate 20 and the strut 12A can be reduced, so that an erroneous engagement resultant of the strut 12A being pulled into the notch 21 can be suppressed.

The selectable one-way clutch according to the present disclosure is specifically explained above as the embodiments. However, the essence of the present disclosure is not limited to those described in the embodiment, and should be interpreted as covering a wider scope based on descriptions in the claims. Furthermore, it should be needless to say that implementations with various changes and modifications are also included in the essence of the present disclosure.

For example, in the first embodiment, only one recess 221 is provided in the width direction of the flat portion 22, as illustrated in FIG. 4, but two or more recesses 221, for example, may be provided in the width direction of the flat portion 22.

Furthermore, in the second embodiment, only one recess 124 is provided in the width direction of the body portion 121 of the strut 12A, as illustrated in FIG. 9, but two or more recesses 124 may be provided to the width direction of the body portion 121.

With the selectable one-way clutch according to the present disclosure, the surface tension of the oil lying between the notch plate and the strut can be reduced during the ratcheting operation. Therefore, an erroneous engagement resultant of the strut being pulled into the notch can be suppressed.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A selectable one-way clutch comprising:
    a pocket plate including a plurality of respective pockets provided along a circumferential direction on one surface of the pocket plate;
    a notch plate that is rotatable with respect to the pocket plate, the notch plate including a plurality of notches provided along a circumferential direction on a surface of the notch plate facing the one surface;
    struts that are plate-shaped and housed in the respective pockets; and
    a selector plate disposed between the pocket plate and the notch plate, and configured to switch, by rotating coaxially with the pocket plate, between: a state in which the struts have risen toward the notch plate; and a state in which the struts are housed in the respective pockets, wherein
    the notch plate includes flat portions between the notches that are adjacent in the circumferential direction,
    each of the flat portions includes a first recess at a position where a top surface of the strut having risen toward the notch plate is brought into contact, and the first recess is formed at a center in a width direction of the flat portion of the notch plate, and
    the first recess has a predetermined depth and the flat portion, and the flat portion contacts the top surface of the strut when the strut rises to be engaged to the notch plate.

2. The selectable one-way clutch according to claim 1, wherein the first recess is a groove extending in the circumferential direction of the notch plate.

3. The selectable one-way clutch according to claim 1, wherein
    each of the notches includes a catching surface inclined in a direction from a bottom surface of the notch toward the pocket plate, and with which the strut is brought into contact when the strut is engaged with the notch, and
    the first recess is provided at a position not overlapping with the catching surface.

4. The selectable one-way clutch according to claim 1, wherein each of the struts includes a second recess at a position where the strut is brought into contact with the flat portion when the strut rises toward the notch plate.

5. The selectable one-way clutch according to claim 4, wherein the second recess is a groove extending in the circumferential direction of the notch plate.

6. The selectable one-way clutch according to claim 5, wherein the strut includes: a body portion that extends in the circumferential direction of the notch plate; and a pair of protrusions that extend from an end of the body portion in the circumferential direction toward opposite directions with respect to each other along a radial direction of the notch plate, wherein
    the second recess is provided from a predetermined position on a top surface of the body portion to a tip of the body portion.

7. The selectable one-way clutch according to claim 6, wherein the width of the first recess is smaller than the width of the body portion of the strut when viewed from a cross sectional view of the flat portion when the strut rises to be engaged to the notch plate.

8. The selectable one-way clutch according to claim 4, wherein the first recess and the second recess are provided at overlapping positions in a rotational axis direction of the notch plate.

9. The selectable one-way clutch according to claim 4, wherein the second recess is provided at a center of a width direction of the strut.

10. The selectable one-way clutch according to claim 1, wherein the groove of the first recess has a bottom surface with a constant depth toward to the pocket plate.

11. The selectable one-way clutch according to claim 1, wherein the groove of the first recess extends in parallel with a surface of the flat portion.

12. The selectable one-way clutch according to claim 1, wherein a depth of the first recess is smaller than a distance from a surface of the flat portion to an end of a catching surface of the notches in the rotational axis direction.

13. A selectable one-way clutch comprising:
a pocket plate including a plurality of respective pockets provided along a circumferential direction on one surface of the pocket plate;
a notch plate that is rotatable with respect to the pocket plate, the notch plate including a plurality of notches provided along a circumferential direction on a surface of the notch plate facing the one surface;
struts that are plate-shaped and housed in the respective pockets; and
a selector plate disposed between the pocket plate and the notch plate, and configured to switch, by rotating coaxially with the pocket plate, between: a state in which the struts have risen toward the notch plate; and a state in which the struts are housed in the respective pockets, wherein
the notch plate includes flat portions between the notches that are adjacent in the circumferential direction,
each of the flat portions includes a first recess at a position where a top surface of the strut having risen toward the notch plate is brought into contact, and the first recess is formed at a center of the flat portion of the notch plate in a width direction,
each of the struts includes a second recess at a position where the strut is brought into contact with the flat portion when the strut rises toward the notch plate, and
the first recess and the second recess have a same width.

14. A selectable one-way clutch comprising:
a pocket plate including a plurality of respective pockets provided along a circumferential direction on one surface of the pocket plate;
a notch plate that is rotatable with respect to the pocket plate, the notch plate including a plurality of notches provided along a circumferential direction on a surface of the notch plate facing the one surface;
struts that are plate-shaped and housed in the respective pockets; and
a selector plate disposed between the pocket plate and the notch plate, and configured to switch, by rotating coaxially with the pocket plate, between: a state in which the struts have risen toward the notch plate; and a state in which the struts are housed in the respective pockets, wherein
the strut includes a body portion that extends in the circumferential direction of the notch plate,
the notch plate includes flat portions between the notches that are adjacent in the circumferential direction,
each of the flat portions includes a first recess at a position where a top surface of the strut having risen toward the notch plate is brought into contact, and the first recess is formed at a center of the flat portion of the notch plate in a width direction, and
the width of the first recess in the width direction is smaller than the width of the strut in, and the first recess has a predetermined depth and the flat portion, and the flat portion contacts the top surface of the strut when the strut rises to be engaged to the notch plate.

15. The selectable one-way clutch according to claim 14, wherein the groove of the first recess has a bottom surface with a constant depth toward to the pocket plate.

16. The selectable one-way clutch according to claim 14, wherein the first recess is a groove extending in the circumferential direction of the notch plate.

17. The selectable one-way clutch according to claim 14, wherein
each of the notches includes a catching surface inclined in a direction from a bottom surface of the notch toward the pocket plate, and with which the strut is brought into contact when the strut is engaged with the notch, and
the first recess is provided at a position not overlapping with the catching surface.

18. The selectable one-way clutch according to claim 14, wherein each of the struts includes a second recess at a position where the strut is brought into contact with the flat portion when the strut rises toward the notch plate.

19. The selectable one-way clutch according to claim 14, wherein the second recess is a groove extending in the circumferential direction of the notch plate.

20. The selectable one-way clutch according to claim 14, wherein the strut includes a pair of protrusions that extend from an end of the body portion in the circumferential direction toward opposite directions with respect to each other along a radial direction of the notch plate, wherein
the second recess is provided from a predetermined position on a top surface of the body portion to a tip of the body portion.

* * * * *